US012670224B2

(12) United States Patent
Rendely et al.

(10) Patent No.: US 12,670,224 B2
(45) Date of Patent: Jun. 30, 2026

(54) BROWSER BASED AGENT

(71) Applicant: GOOGLE LLC, Mountain View, CA (US)

(72) Inventors: Matthew Spencer Rendely, Seattle, WA (US); Negar Rahmati, Emerald Hills, CA (US); Travis Coe Service, Mountain View, CA (US); Tarun Bansal, Bellevue, WA (US); Thomas Nont Boonsiri, Santa Clara, CA (US); Benjamin Morrison Greenstein, Seattle, WA (US); Yuchang Hu, Saratoga, CA (US); Sergio Eduardo Collazos Iriarte, San Francisco, CA (US); Daniel June Hyung Park, Pasadena, CA (US); Timothy Youngjin Sohn, Los Altos, CA (US); Keshav Dhandhania, San Mateo, CA (US); Rui Feng, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/977,820

(22) Filed: Dec. 11, 2024

(65) Prior Publication Data

US 2026/0161723 A1     Jun. 11, 2026

(51) Int. Cl.
| | |
|---|---|
| *G06F 16/27* | (2019.01) |
| *G06F 16/22* | (2019.01) |
| *G06F 16/957* | (2019.01) |
| *G06F 16/958* | (2019.01) |

(52) U.S. Cl.
CPC .......... *G06F 16/957* (2019.01); *G06F 16/958* (2019.01)

(58) Field of Classification Search
CPC ............................ G06F 16/957; G06F 16/958
See application file for complete search history.

(56) References Cited

U.S. PATENT DOCUMENTS

| | | | | |
|---|---|---|---|---|
| 9,652,739 | B2 * | 5/2017 | Siegal .................... | G06Q 10/10 |
| 2015/0026148 | A1 * | 1/2015 | Howes .................... | G06F 16/93 |
| | | | | 707/706 |
| 2018/0253759 | A1 * | 9/2018 | Deng ................. | G06Q 30/0243 |
| 2020/0125664 | A1 * | 4/2020 | Tiwary .................... | G06F 16/27 |
| 2020/0175222 | A1 * | 6/2020 | Sherwood ........... | H04L 12/2836 |
| 2022/0269738 | A1 * | 8/2022 | Stone .................... | G06F 3/0482 |
| 2023/0306049 | A1 * | 9/2023 | Shah .................. | G06F 16/3329 |

(Continued)

OTHER PUBLICATIONS

"Taxy AI/Browser-Extension", MIT license, Apr. 13, 2023, 7 pages.

(Continued)

*Primary Examiner* — Kuen S Lu

(74) *Attorney, Agent, or Firm* — Brake Hughes Bellermann LLP

(57) ABSTRACT

Disclosed implementations for an agent configured to determine and execute a set of actions related to an instruction provided by a user. In an example implementation, a prompt that includes an instruction is received. An action to be performed using an online resource to accomplish the instruction is determined by providing the prompt and browser data associated with a user to a generative model as input. The action is performed using the online resource. An indication that the instruction is completed is provided.

20 Claims, 14 Drawing Sheets

500

(56)           References Cited

U.S. PATENT DOCUMENTS

2024/0256615 A1\* 8/2024 Liu ...................... G06F 16/954
2025/0225387 A1\* 7/2025 Krabach ................ G06F 16/25

OTHER PUBLICATIONS

Xi, et al., "The Rise and Potential of Large Language Model Based
Agents: a Survey", arXiv:2309.07864v3, Sep. 19, 2023, 86 pages.
Zhang, et al., "UFO: a UI-Focused Agent for Windows OS Inter-
action", arXiv:2402.07939v5, May 23, 2024, 30 pages.
Zheng, et al., "GPT-4V(ISION) Is a Generalist Web Agent, If
Grounded", ArXiv.org (https://arxiv.org/pdf/2401.01614), Mar. 12,
2024, 36 pages.
Zhou, et al., "Webarena: a Realistic Web Environment for Building
Autonomous Agents", arXiv:2307.13854v4, Apr. 16, 2024, 22 pages.

\* cited by examiner

230

232

202

○ ○ ○   ○ Syllabus-Bell High.. ×|   Mail Tab   × | ⚙ Settings   × | Reservations Tab ✦ × |+   ○ Finding restaurants...

↑ ↓   ↻   ⇄ availabletable.com    ☆   ○   ⟳ ⫿   ⬡ ···

You're almost done!

Restaurant C (Mtn View)
📅 Fri, Nov 7 🕖 7:00 PM ☖ 6 people (standard seating)

We're holding this table for you for 2:27 minutes

Diner details

| John | Doe |

| 📱 ⌄ | 4082001000 | dinner@url.com |

| Select an occasion (optional) ⌄ | Add a special request (optional) |

☑ Sign me up to receive dining offers and news from this restaurant by email
☐ Yes, I want to get text updates and reminders about my reservations Complete reservation

234

By clicking " Complete reservation" you agree to the OpenTable Terms of Use and Privacy Policy. Message & data rates may apply. You can opt out of receiving text messages at any time in your account settings or by replying STOP

Receive Prompt
502

Determine Action
504

Perform Action
506

Provide Indication
508

BROWSER BASED AGENT

BACKGROUND

Browsing and performing tasks related to an online resource via a browser often requires complex interactions across multiple online resources and tabs. These tasks can be repetitive, tedious, and complex when performed manually.

SUMMARY

Automating online tasks refers to using software tools to perform repetitive actions on websites such as filling out forms, clicking buttons, scraping data, or interacting with web applications, essentially mimicking a user's interactions with an online resource via a browser application. Current approaches for task automation include browser agents, which are software programs configured to perform actions for a user via the web often with the goal of increasing efficiency and saving time. At least one technical problem with the current approaches for automating online tasks is the difficulty with building an agent that is both scalable and generalized to handle multiple types of online tasks.

The implementations described herein provide at least one technical solution to these technical problems via a generative model (also referred to herein as an artificial intelligence (AI) agent or simply "agent") trained to understand a user's browsing history, i.e., online resources, such as webpages, that a user has visited using their browser; digest this information; and determine and an execute a number of online tasks, i.e., tasks that can be completed using an online resource, related to an instruction (i.e., a goal) requested by a user. The agent also determines which of the online tasks can be run in parallel and which online tasks need to be run in a series. Online tasks are run in a series where the output or completion of one online task is used as input for a next online task. The agent executes these tasks accordingly. In some cases, the agent provides a series of prompts to the user when additional information is required to accomplish an online task. In some cases, the agent provides status updates for each online task (or grouping of online tasks) to the user as the agent executes the online tasks.

In an example implementation, a prompt is received via a browser. The prompt includes an instruction requested by a user. Actions are determined via a generative model based on browser data associated with the user. Browser data may include data stored as the user interacts with online resources via the browser. The actions are associated with at least one online resource such as a webpage or a document. The actions are performed via the at least one online resource. An indication that the instruction is completed is provided via the browser based on completing the actions. For example, an overlay window, tab, an alert message or separate browser window with a message indicating that the instruction has been completed or with a calendar and appointment scheduled based on the results of the actions, such as making a reservation, may be provided to the browser.

It is appreciated that methods in accordance with the present disclosure can include any combination of the aspects and features described herein. That is, methods in accordance with the present disclosure are not limited to the combinations of aspects and features specifically described herein, but also may include any combination of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF THE DRAWINGS

FIGS. 2A-2I depict example pages or page elements that may be employed within the described goal automation system.

DETAILED DESCRIPTION

Figure 1:
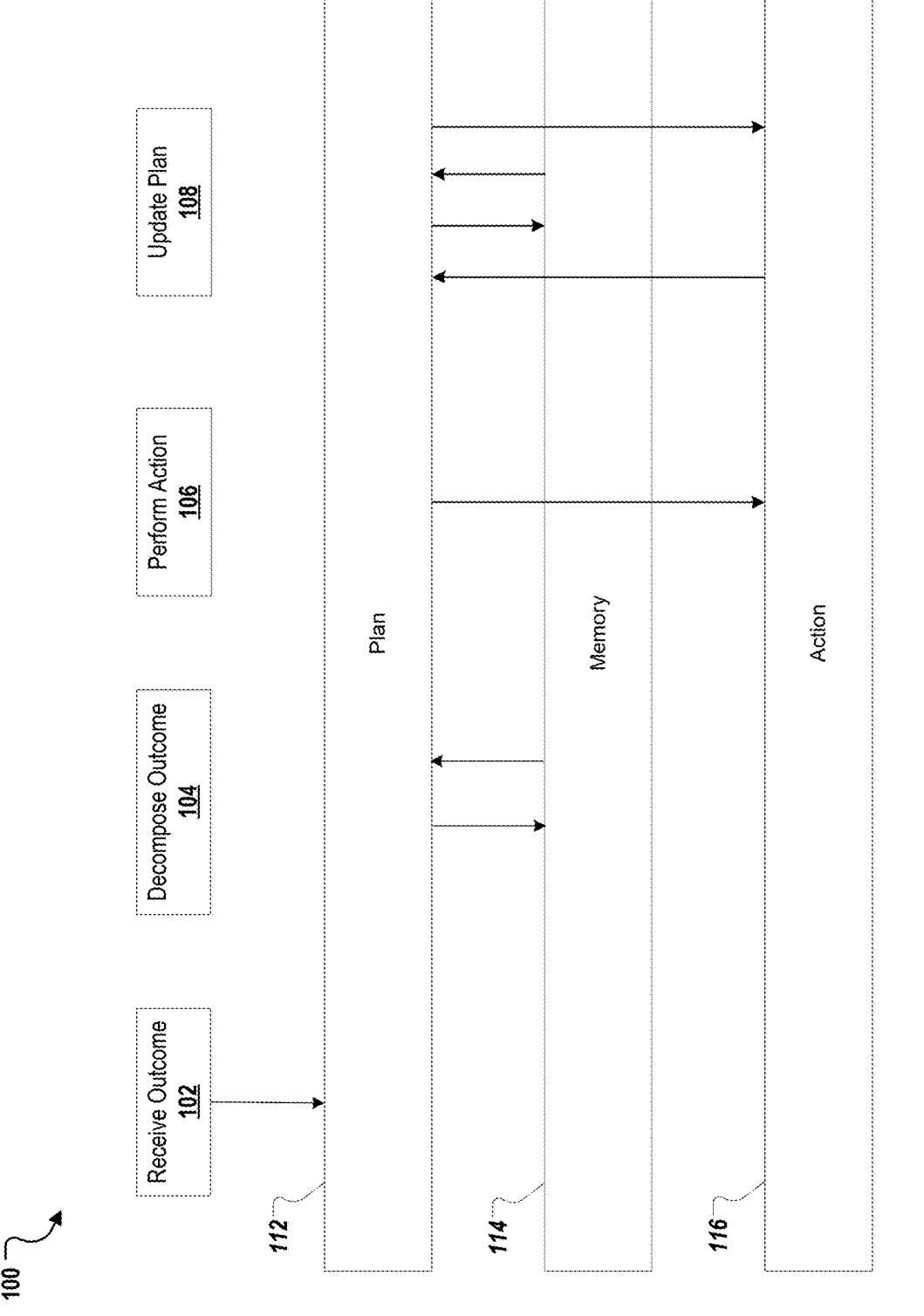
FIG. 1 depicts an implementation of the logic flow for task automation performed by implementations of the present disclosure.

Performing tasks on the Internet using a browser often requires multiple actions encompassing complex interactions across multiple online resources and multiple tabs. These actions can be repetitive, tedious, and complex when performed manually. Accordingly, implementations described herein include a system employing a generative model for determining a set of online-related tasks, e.g., tasks that can be performed via a browser application, for a requested instruction (i.e., a goal) provided via a user interface and automating these online-related tasks. An instruction may include an aim or a desired outcome of a user that can be accomplished by interacting with online resources. In some cases, the generative model replicates manual interactions performed via a browser application providing convenience for the user while enabling the user to tailor content and functionality to detect potential security risks or malicious activity while increasing both the speed and efficiency of each online-related task.

At least one technical problem with current approaches for automating online tasks, or in other words tasks performed via a browser or browser-based operating system, is the difficulty with building an agent (e.g., a generative model) that is both scalable, e.g., able to concurrently execute tasks related to multiple instructions (goals) provided by the user and generalized to handle multiple types of online-related tasks. One facet of this problem relates to the difficulty in creating a training dataset capable of producing an effective agent. Another facet is the difficulty in leveraging trusted user context and authorization data, e.g., login credentials, payment data, and the like, in a safe and effective way. Moreover, effectively incorporating context that is relevant to a particular user, such as past browsing, actions, personal preferences, and the like, is also challenging.

Accordingly, implementations described herein provide at least one technical solution to these technical problems by employing a generative model, e.g., an agent, that is capable of understanding online based content; determining a plan of action, e.g., a series of online-related tasks, to accomplish an online-related instruction provided by a user, and executing the necessary actions associated with each online-related tasks according to the plan of action. In some implementations, the agent secures user data by isolating data which restricts access by the agent to raw authentication data such as passwords, payment information, and the like. Instead, the agent may employ autofill features secured via a browser application e.g., the agent may be configured to invoke an action when filling out protected information that is handled by, for example, the secure autofill feature provided by the browser. In some implementations, the agent secures user data using user confirmations where the agent is configured to interrupt the user interaction with the browser to determine when sensitive data is employed and provide confirmation when executing actions using this sensitive data. Thus, the user experience can be improved because users are able to efficiently and safely (e.g., data access is restricted and encrypted) determine and execute a number of tasks related to an instruction with the help of a generative model.

In some implementations, the described goal automation system provides a generative model that includes generative models trained to understand the online resources, e.g., webpages, that a user has visited using their browser. The agent is trained to reason about a plan and actions to take to help accomplish a requested instruction. In some cases, the agent connects the generative models to the browser via application programming interfaces (APIs) or extensions to actuate the browsing on behalf of the user. In some implementations, the agent, e.g., the generative models, is trained using a training dataset generated to increase the accuracy and scalability.

Example use cases for the agent include automated browsing on a single domain. For example, a user provides a prompt with a requested instruction, such as "find homes with a modern kitchen." The agent may be trained to automatically fill in search fields and navigate to relevant search results for a particular domain. Other example use cases include automated browsing across multiple domains. For example, a user may provide a prompt with an instruction to "order groceries for my soup recipe." The agent may be trained to parse the ingredients list; open a grocery website, search for each item; add the items to a shopping cart, and so forth. Another example use case includes automating actions on the browser. For example, a user provides a prompt with an instruction to "create a tab group of recent job postings." The agent may be trained to open a search resource, e.g., a webpage of recent job postings, open new tabs from the most recent links, and organize these into a tab group. Another example use case includes incorporating user context for improved automation. For example, a user provides a prompt with an instruction to "find events this weekend." The agent may be trained to use a curated set of user preferences from past interests and brows to select relevant events. Yet another example use case includes automation run as a background process. For example, a user provides a prompt with an instruction to "buy tickets for a particular event when they go on sale." The agent may be trained to run in the background and periodically check for ticket availability and purchase the ticket when they are available.

FIG. 1 depicts an example implementation 100 of a logic flow for task automation performed by a portion of the described goal automation system. The example implementation 100 includes plan model 112, memory model 114, and action model 116, which may be implemented via a trained generative model(s). A generative model is a type of artificial intelligence that can create new content, such as text, images, or audio, by learning patterns from training data, e.g., a large dataset, and generating outputs that are similar to the training data thus allowing the model to produce original content based on acquire information. Put another way, a generative model is trained to generate new information that shares characteristics with the training data, rather than simply classifying existing data. Together, these models 112, 114, and 116 may be referred to herein as an agent. Moreover, although illustrated as separate models, one or more of the generative models 112, 114, and 116 can be combined into a single generative model.

In some cases, the models 112, 114, and 116 are each built using a foundational model, a model that is trained on vast datasets to be applied across a wide range of use cases and trained using a combination of prompting or supervised fine tuning (SFT) to improve models for their assigned use case or function within the overall generative model. For example, the plan model 112 may be provided prompting that teaches about tools that can be used to obtain additional information about a user's state and personalization data such as the online resource they most frequent, and the preferences when using the browser. In some cases, synthetic training data sets may be generated to improve how the plan model 112 formulates an effective set of actions related to a series of tasks for accomplishing a requested instruction (goal) and how best to execute, e.g. linear or in parallel, these actions.

In some implementations, the plan model 112 is configured to receive (step 102) and decompose (step 104) instructions, e.g., generate a set of online-related actions to accomplish a requested instruction, that are provided by a user. In some cases, the user provides an instruction via a user-interface component associated with a browser. The user-interface allows the user to generate a prompt that includes a requested instruction(s) with related information. The user-interface may provide the prompt to a back-end service provided via a server and receive actions for the browser to implement. The actions can include additional prompts for the user to respond to, actions to be performed to complete a particular task, and so forth. In some implementations, the browser is configured to automatically execute the actions to complete a task, e.g., via the action model 116, and/or prompt the user for user authorization when deemed necessary, e.g., based on a configuration, user preferences, and the like. In some implementations, the user-interface component provides updates to the user based on actions completed or actions currently in-progress by the action model 116. The updates allow the user to monitor the progress of the goal automation system. In some implementations, the user-interface component allows the user to intervene in the execution of various actions (or overall tasks) that are associated with an instruction provided by the user. For example, the user may be prompted to provide authorization, accept terms of service, select an element or item, and so forth. FIGS. 2A-4C, which are described below, depict various aspects of an example user-interface that may be employed by the described goal automation system.

In some implementations, when a user provides a requested instruction, the plan model 112 is trained to determine a number of related online-based tasks, e.g., one or more tasks, that are required to accomplish the requested instruction. The one or more related tasks are referred to as a plan. For example, booking a trip to Spain includes tasks for booking airfare; securing living accommodation, e.g., a hotel room; arranging travel between cities, e.g., a bus or train pass or a rental car; scheduling an itinerary; and the like. An online-based task can be accomplished via one or more actions, e.g., a series of actions, that may include interactions with one or more online resources, e.g., filing out an online-based form(s). For example, the task of booking airfare for the user's trip to Spain may be broken down into a series of online-based actions, e.g., filling out a series of forms provided by a website(s).

In some implementations, the plan model 112 is also configured to determine when additional information may be required to complete a task (or an action required to complete a task) based on the information stored to the memory model as well as information that is included with the online-based task and prompt the user accordingly. In some cases, the plan model 112 may first access a set of user-provided preferences, e.g., a preferred rental car or form of payment. In some cases, the plan model 112 generates prompts for the user to provide additional information related to a task or an action related to a task. For example, the plan model 112 may prompt the user to select a preference when no user preference has been set, e.g., "what type of car would you like to rent for the trip" or "which payment would you like to use to book the trip." In some cases, the plan model 112 determines task related information based on the user's interaction with the browser, e.g., the form of payment most used by the user when booking travel. Such preferences may be stored, with user permission, in association with a profile for the user.

In some implementations, the memory model 114 includes information collected by the plan model 112 that is related to the online-based task set by the user including related information from the user's interaction with a browser, collected with user permission. This browser data may include, for example, a browsing history, transaction data, mapping and location data, and the like. In some cases, the browser data may include information provided by a search system, such as search system 420 described below with reference to FIG. 4. For example, the plan model 112 may generate a task that is associated with an online resource, such as a website or webpage, that the user has not before visited such that no browser history exists for the user and site. In such cases, the plan model 112 and/or memory model 114 may be configured to aggregate browsing data provided by the search system to determine a typical or example set of data that is related to the task and/or website where the task is to be executed.

In some implementations, the memory model 114 is a generative model, such as a language model, which is an AI model designed to process and generate human language, trained to process unstructured data, such as data stored to an unstructured data store, to identify the relevant information. For example, the memory model 114 may be trained to identify information related to a query related to an instruction, tasks to accomplish an instruction provided by a user, or actions to accomplish a specific task related to an instruction (i.e., goal). For example, memory model 114 may be trained to process the natural language of online content and retrieve information for a particular query. To resolve a query, the memory model 114 may store context information, e.g., keywords, object identification, and the like, from previously visited online resources by the user. The memory model 114 may store or may have access to, with user permission, historical user interactions with previously visited online resources and/or user preferences. In some implementations, the memory model 114 stores the context as an unstructured data store that is searchable by the plan model 112 or the action model 116.

In some implementations, the action model 116 retrieves the browser data from the memory model 114 for a particular user when planning and/or performing a task (e.g., populating a form field) for the user as well as when generating recommendations for the user. In some implementations, once the plan model 112 determines that each task necessary to accomplish the user's goal has sufficient information, e.g., information that was provided with the instruction or via the additional prompts provided to the user and/or relevant information stored to the memory model 114, the plan model 112 initiates automation of the instruction via the action model 116.

In some implementations, action model 116 is a multimodal acting model that is configured to process content provided by an online resource to determine how to click, type, scroll, autofill, and otherwise navigate the online resource. For example, when an online resource provides content via an OpenAPI standard, the action model 116 is configured to process the content and interact via the provided OpenAPI standard. The OpenAPI standard is an example of a language-agnostic interface used to call an application (service) that performs one or more actions. Such a language-agnostic interface can include descriptions of endpoints and parameters, which provides an understanding (for both humans and computers) of the capabilities of the application (service). In some implementations, action model 116 is configured to perform (step 106) each task, e.g., via interactions with an online source, and update the status of the provided instruction based on the outcome/response of each action (step 108). For example, when a task is complete, the action model 116 may provide the instruction of the task, e.g., the output provided by an online resource when booking travel. In some cases, the action model 116 may perform two or more of the tasks related to an instruction in parallel or in a series according to the requirements of the task. To put another way, some tasks may be independent of one another and therefore able to be executed by the action model 116 in parallel whereas some tasks may be dependent on the outcome of one or more tasks and therefore the action model 116 may execute these tasks in a particular order.

In some implementations, the action model 116 is trained via supervised learning. In an example user case, a labeled data set is generated with outcome prompts, e.g., prompts related to each task needed to complete an instruction (i.e., a goal). The labeled data set may include, for example, step-by-step screenshots, browsing actions, and the like. Browsing actions include, for example, clicking, scrolling, typing, field selections, and the like. The action model 116 is then trained using the labeled dataset. In some cases, additional training may be used to identify sensitive actions, i.e., actions related to a particular task, where additional safeguarding may be needed such as a "checkout" step.

FIGS. 2A-2I depict example pages or page elements that may be employed within the described goal automation system to allow the user to enter an instruction as well as information related to the instruction. These example pages and page elements are described with reference to FIGS. 2A-2A using an example where a user has an instruction to set reservations for dinner; however, as described above, the described goal automation system may be employed to assist users with automating any online-based outcome or task. In some implementations, the agent, via the plan model 112, processes a user-provided prompt and determines the various tasks (and actions for each task) required to accomplish an instruction (i.e., complete the goal). As described above with reference to FIG. 1, the plan model 112 may interact with information stored to the memory model 114 to formulate opinionated suggestions to confirm with the user.

Figure 2A:

FIG. 2A depicts an example page 200 where a user may enter a prompt related to an instruction. The example page

200 shows a user prompt related to making a dinner reservation: "Help me find a dinner reservation for this dinner." The example page 200 includes a page element (or page overlay) 202 where the user can provide the generative model a prompt. In some implementations, the information provided with the page element 202 as well as other information that may assist the agent in determining the nature of the prompt and instruction are provided to the generative model, which includes the models 112, 114, and 116 described above with reference to FIG. 1. For example, the prompt shown in FIG. 2A includes "this dinner"; however, the tab that the user currently has open is a web-based email client and in particular an email to the user regarding booking dinner for "6 of us tonight". Accordingly, the generative model may process this contextual information to determine that "this dinner" refers to a dinner for six people this evening.

Figure 2B:
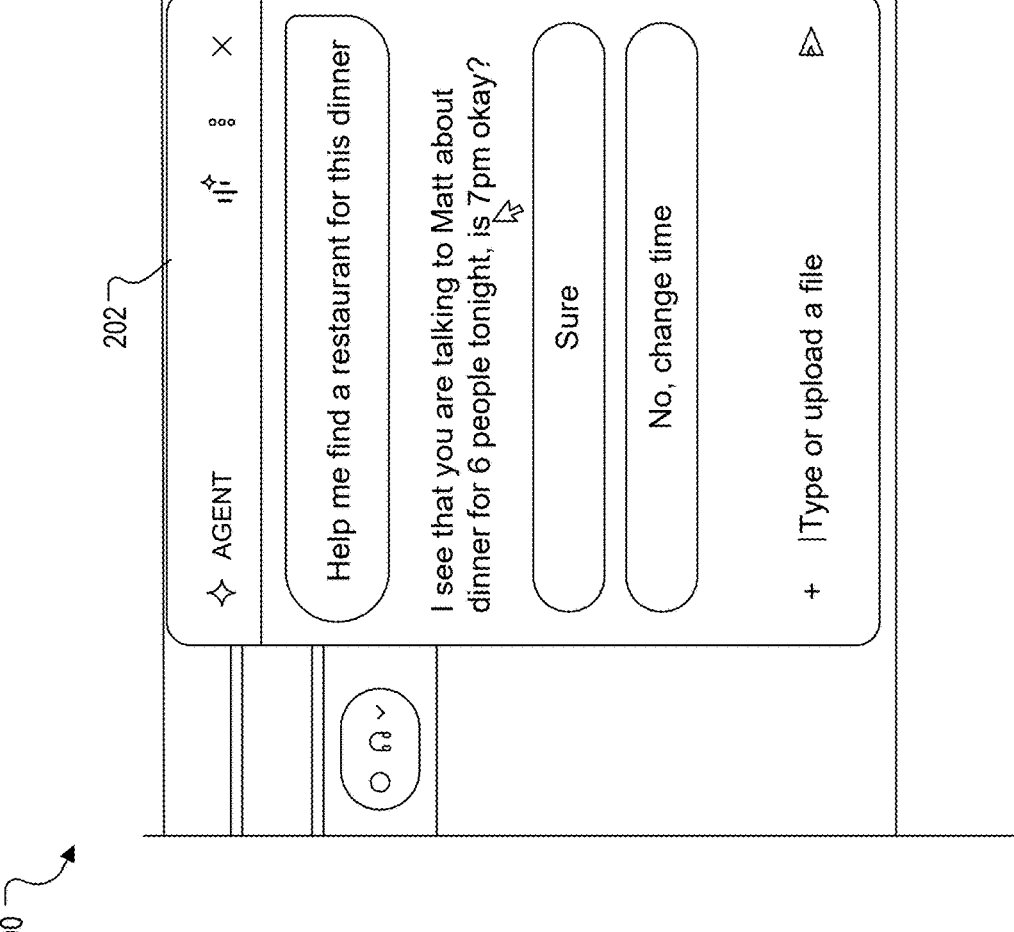

FIG. 2B depicts the example page 200 where the page element 202 is updated, after the user has entered an instruction, to prompt the user to provide information related to the instruction and/or a task to accomplish the instruction as determined by the generative model, e.g., via the plan model 112. In the depicted example, the page element 202 shows user prompts related to data elements extracted from the currently visited online resource (the page displaying the web-based email client) to accomplish the instruction of making dinner reservations. In the example of FIG. 2B the extracted data elements include dinner and a party of 6 people. In the example of FIG. 2B, a suggested data element of 7 pm is also included. The suggestion may be based on a data element extracted from the online resource, e.g., 7 pm is suggested based on "tonight." These data elements may be provided to the user in the form of the proposed prompt: "I see that you are talking to Matt about dinner for 6 people tonight, is 7 pm okay?" The user is able to provide a response via the interface provided in the page element 202. The response may enable the user to change the suggested data element. The response may enable the user to change one or more of the extracted data elements. In this particular example, controls for "Sure" or "No, change time" are provided that enable the user to confirm the prompt or to change the prompt. Although not illustrated in FIG. 2B, a control for receiving an update to the extracted data element (e.g., by making the number 6 a drop-down selection box) can also be provided.

Figure 2C:
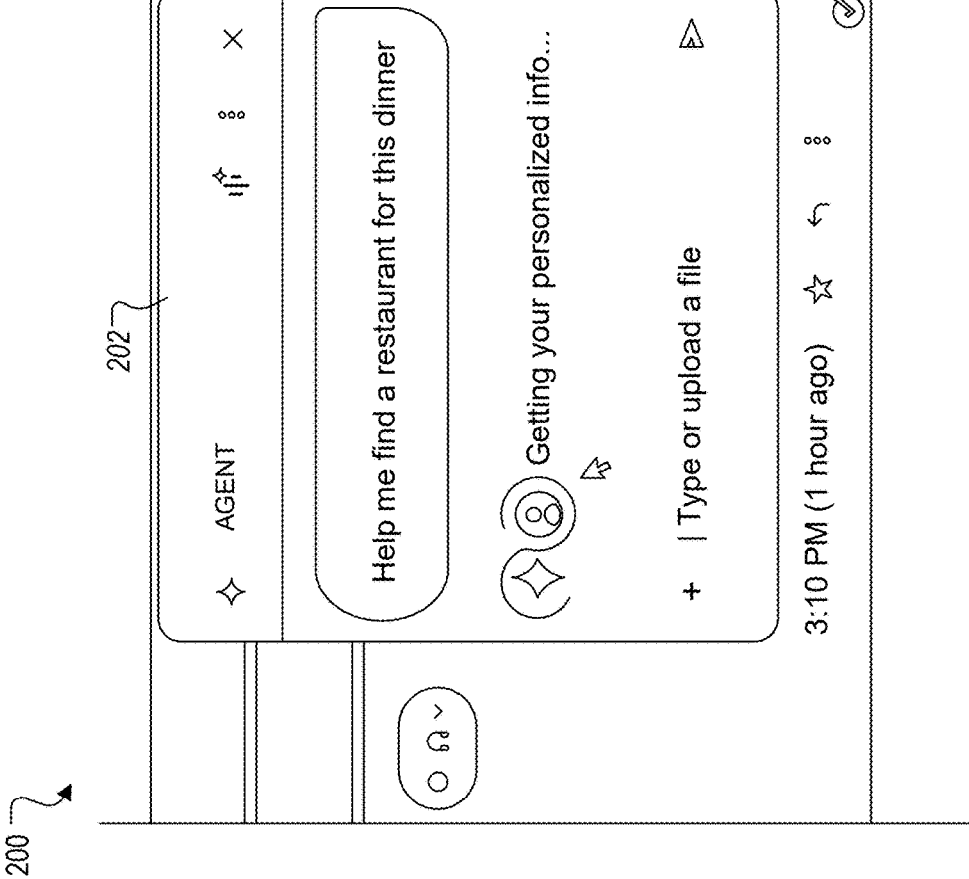

FIG. 2C depicts the example page 200 where the page element 202 provides status information to the user after the additional information related to the instruction is provided by the user. In the depicted example, the page element 202 shows a status indicating that the generative model has received the information and is working on the problem: "Getting your personalized information."

Figure 2D:
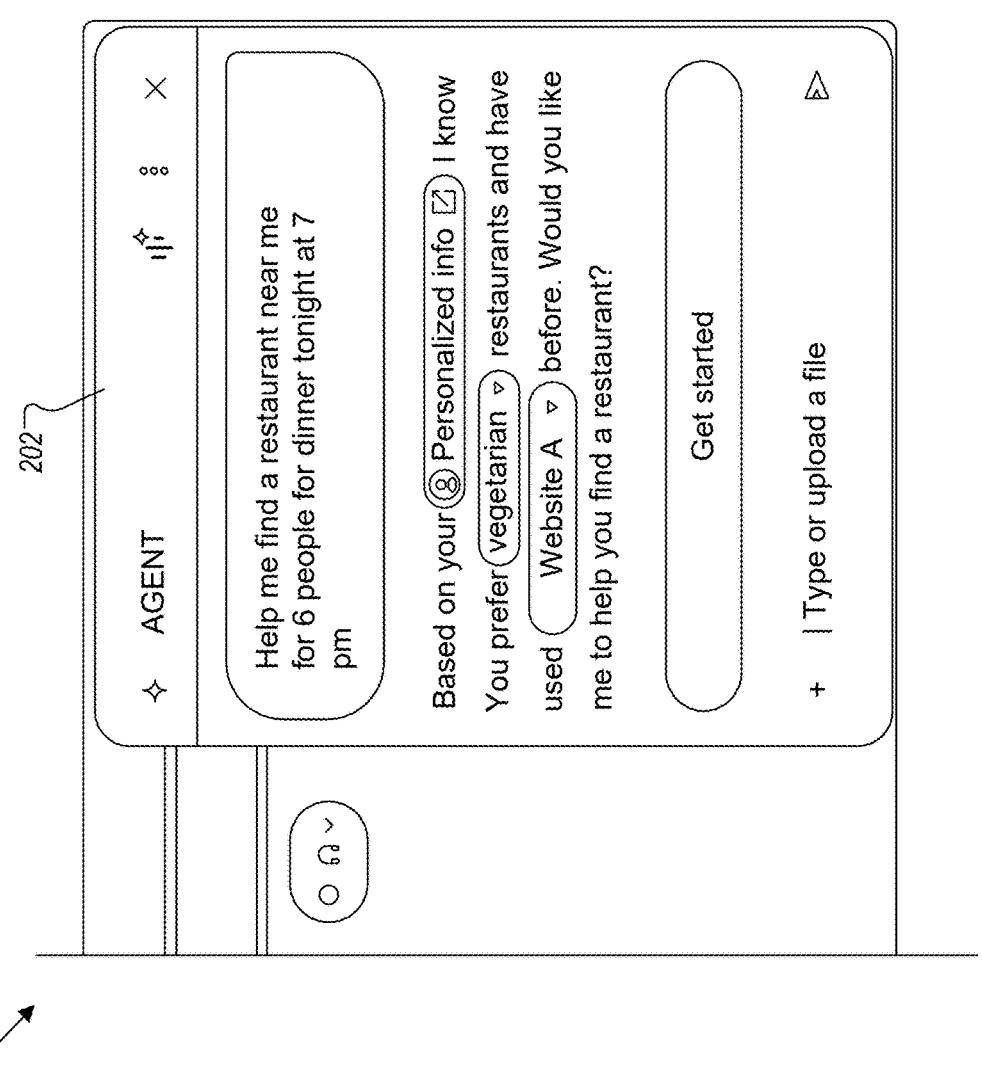

FIG. 2D depicts the example page 200 where the page element 202 is updated to provide the user with the information related to the instruction that has been retrieved by the generative model, e.g., via the plan model 112 accessing information stored to the memory model 114: "Based on your [personalized info], I know you prefer vegetarian and have use [website A] before. In some cases, some or all of this information may be updated by the user. For example, as shown in FIG. 2D, the personalized information is clickable by the user such that the user may select this element and review the personalized information, e.g., browser data, related to the current instruction provided by the user. The personalized information may also be referred to as history information or profile information. The user preference of restaurants, vegetarian, and the website user to book the reservation, website A, are also updatable. The depicted example displays these updatable variables in a dropdown list; however, any webform or editable content may be employed to provide this feature to the user. The page elements 202 also include a prompt for the generative model to continue: "Would you like for me to help you find a restaurant" with a selectable button for "Get started."

Figure 2E:
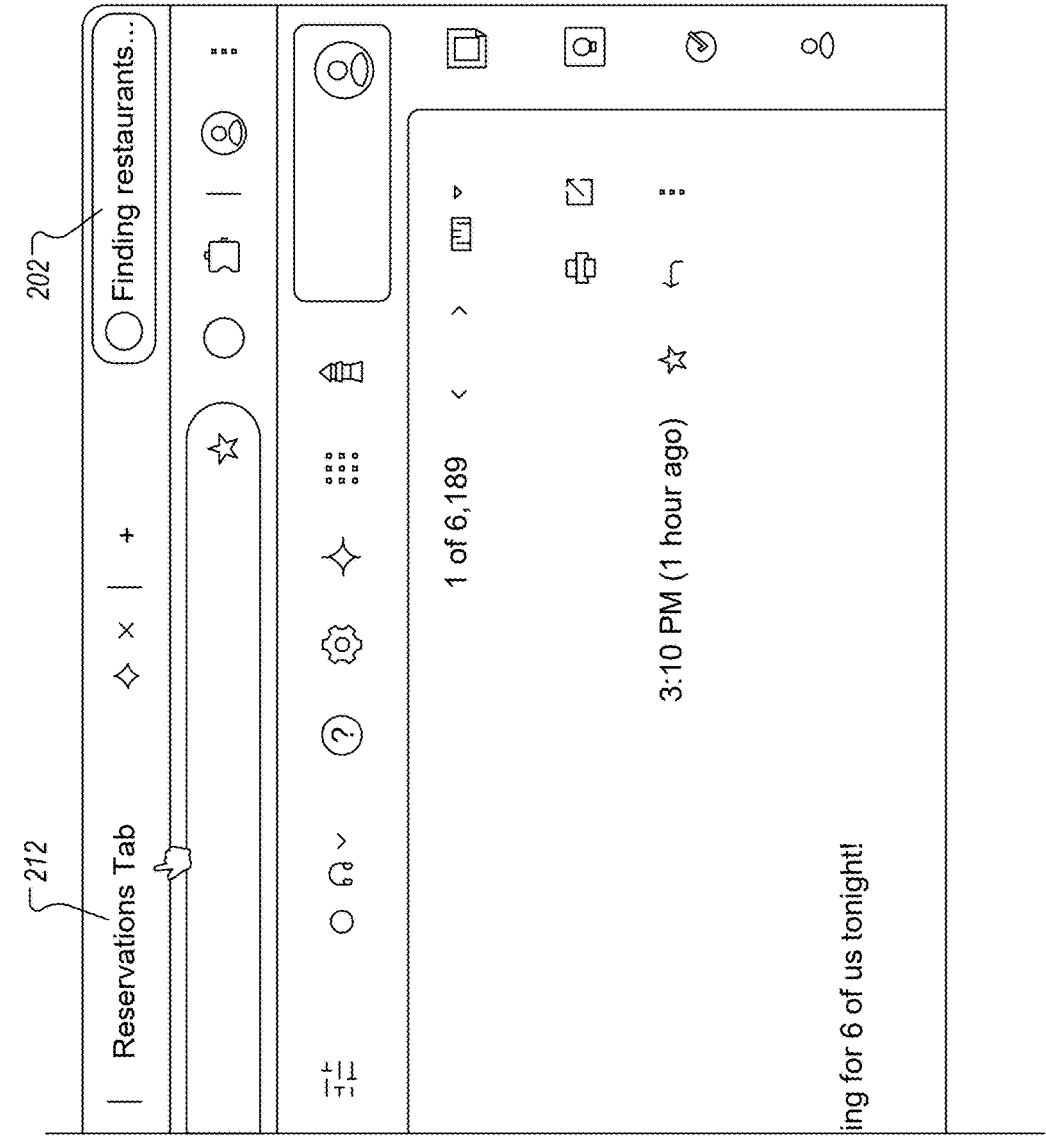
Figure 2E:
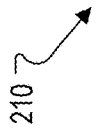

FIG. 2E depicts an example page 210 having new tab elements related to the current task being performed by the generative model, e.g., via the action model 116. In the depicted example, the example page includes a tab 212 for the reservation website; however, the browser may be configured to continue showing the original tab, in this example, the webmail tab such that the generative model is working in the background from the perspective of the user. The example page 210 also includes the page element 202, which shows a status update for the user: "Finding restaurants." In some implementations, the generative model may not prompt the browser to display a new tab to the user depending on the instructions, tasks determined to be completed to accomplish the instruction, user preferences, system configuration, and so forth.

Figure 2F:
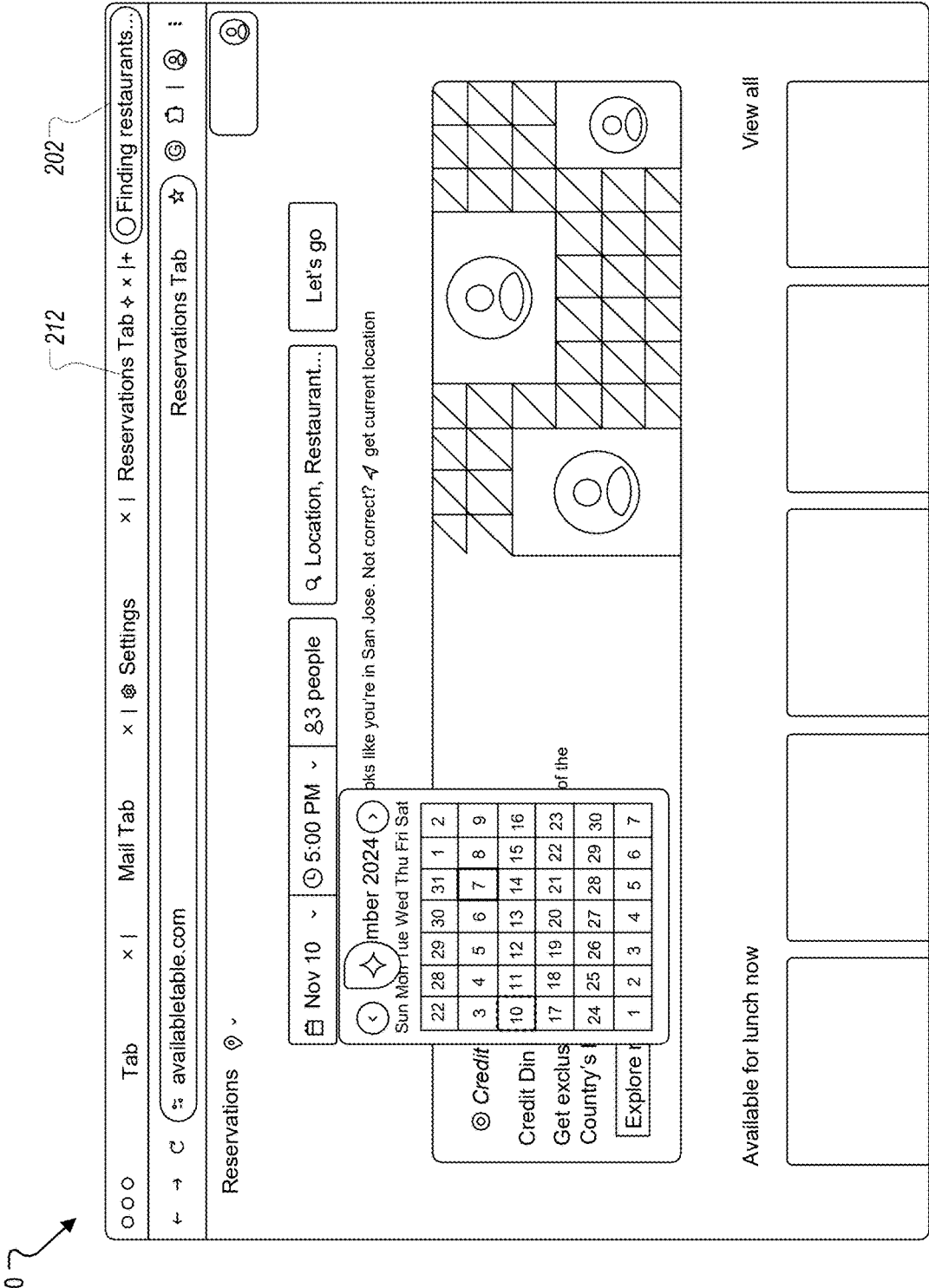

FIG. 2F depicts an example page 220 having new tab elements that are open related to the current task being performed by the generative model, e.g., via the action model 116. In the depicted example, the example page includes the tab 212 that is opened to the reservation website and in the foreground. In this example, the generative model, working through the browser application, may be configured to show the user the interaction between the agent, e.g., the action model 116, and the related online resource, e.g., the reservation website. The example page 220 also includes the page element 202, which again shows a status update for the user: "Finding restaurants."

Figure 2G:
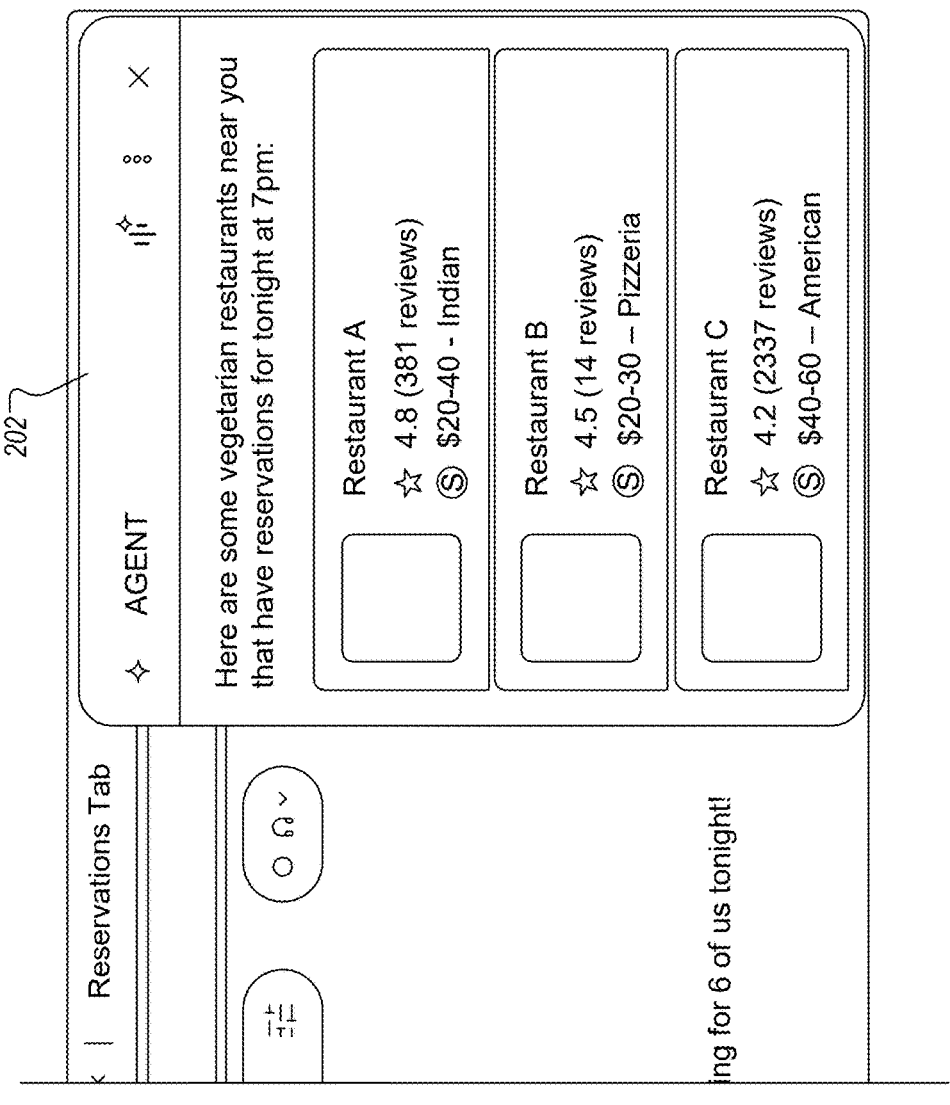
Figure 2G:
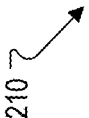

FIG. 2G depicts the example page 210 where the page element 202 is updated to provide the user with the information related to the instruction or tasks related to the instruction that has been acted upon by the generative model, e.g., via the action model 116: "Here are some vegetarian restaurants near you that have reservations for tonight at 7 pm." The page element includes a list of restaurants to form which the user may select as well as some information related to each restaurant.

FIG. 2H depicts an example page 230 where the user has selected a restaurant, Restaurant C, and a tab 232 is opened to the reservation website. In the depicted example, the generative model has taken the various actions related to the task of making a reservation, in this case filing out the various form elements, and is prompting 234 the user to complete the last action (or one of the last actions) to complete the reservation. Again, in some implementations, the generative model may prompt the user for confirmation depending on the instruction, tasks that are determined to be completed to accomplish the instruction, user preferences, system configuration, and so forth.

Figure 2I:
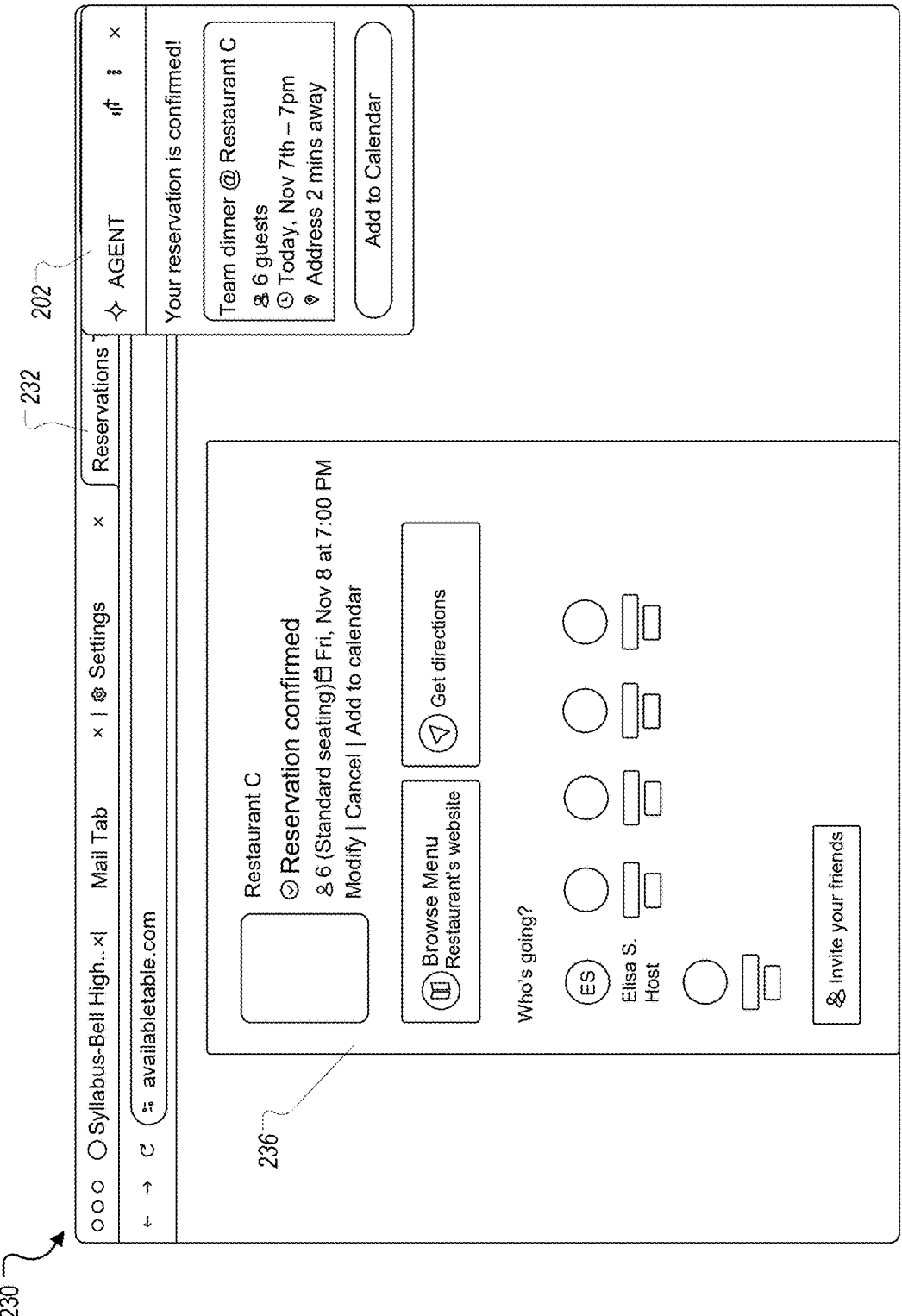

FIG. 2I depicts the example page 230 where the user has confirmed the reservation. The tab 232 shows information related to the reservation 236 such as the name of the restaurant, time, and party size. In the depicted example, the page element 202 also provides this information to the user: "Your reservation is confirmed! Team dinner @Restaurant C, 6 Guests" along with the date of the reservation, the address of the restaurant, and distance to the restaurant.

Figures 3A, 3B, 3C:
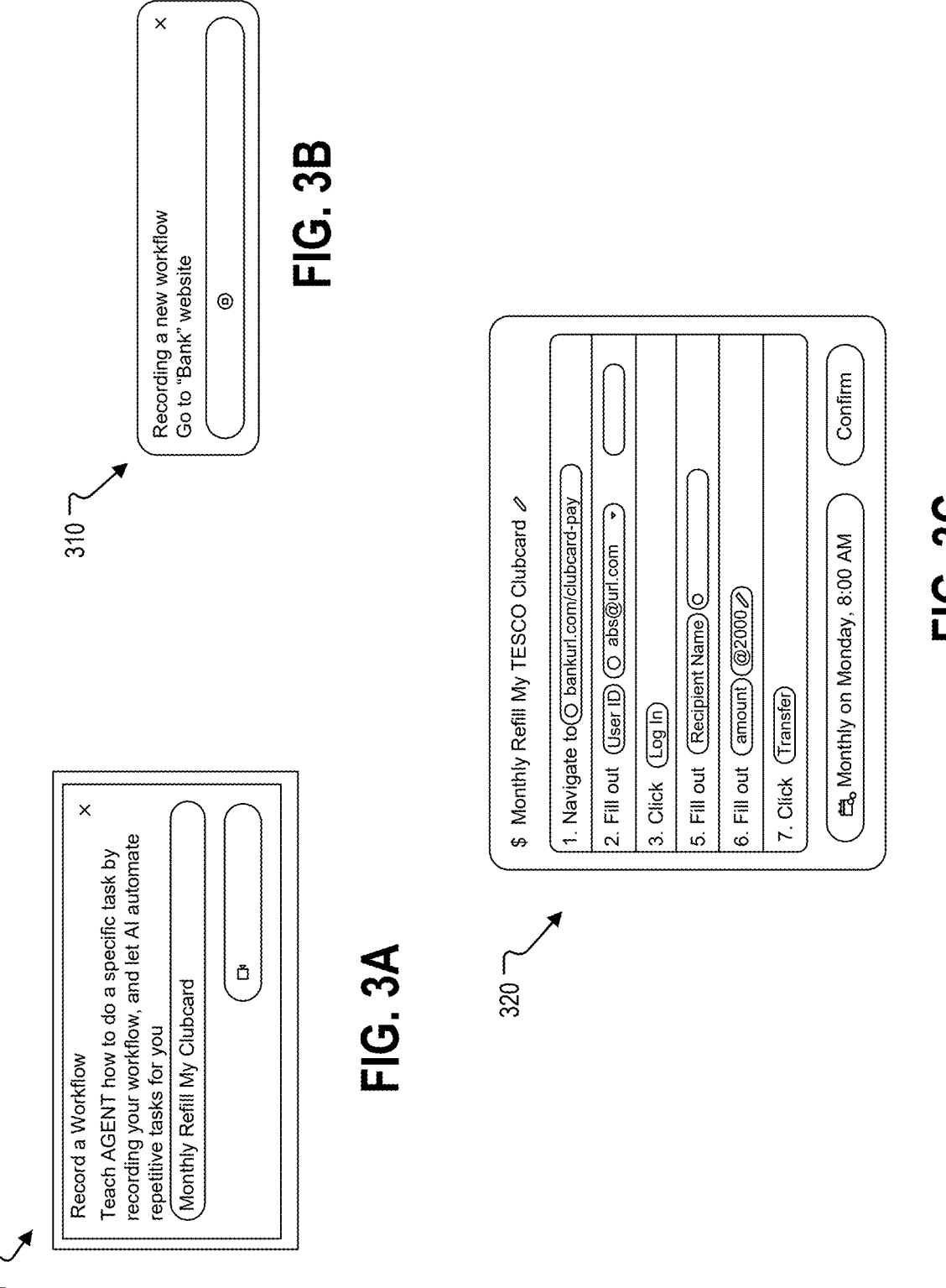
FIGS. 3A-3C depict example page elements for training the generative model with recorded user sessions.

FIGS. 3A-3C depict example page elements for how a user can train the generative model by recording a task or a workflow performed via the browser. FIG. 3A depicts an example page element 300 where the user is prompted to start recording a task. Once a user starts recording, the browser is configured to record the user's interaction with various online resources related to the task. For example, the user may record himself or herself making dinner reservations or booking travel by interacting with online resources related to these instructions and the various tasks required to complete the instruction (i.e., goal). FIG. 3B depicts an example page element 310 where the user is prompted to end the recording FIG. 3C depicts an example page element 320 where the user is prompted to confirm the actions related to tasks for a particular instruction at which time the generative model is provided with the recording. The generative model then uses this recording to plan and execute tasks via the three models 112, 114, and 116 described above with reference to FIG. 1.

Example Environment

Figure 4:
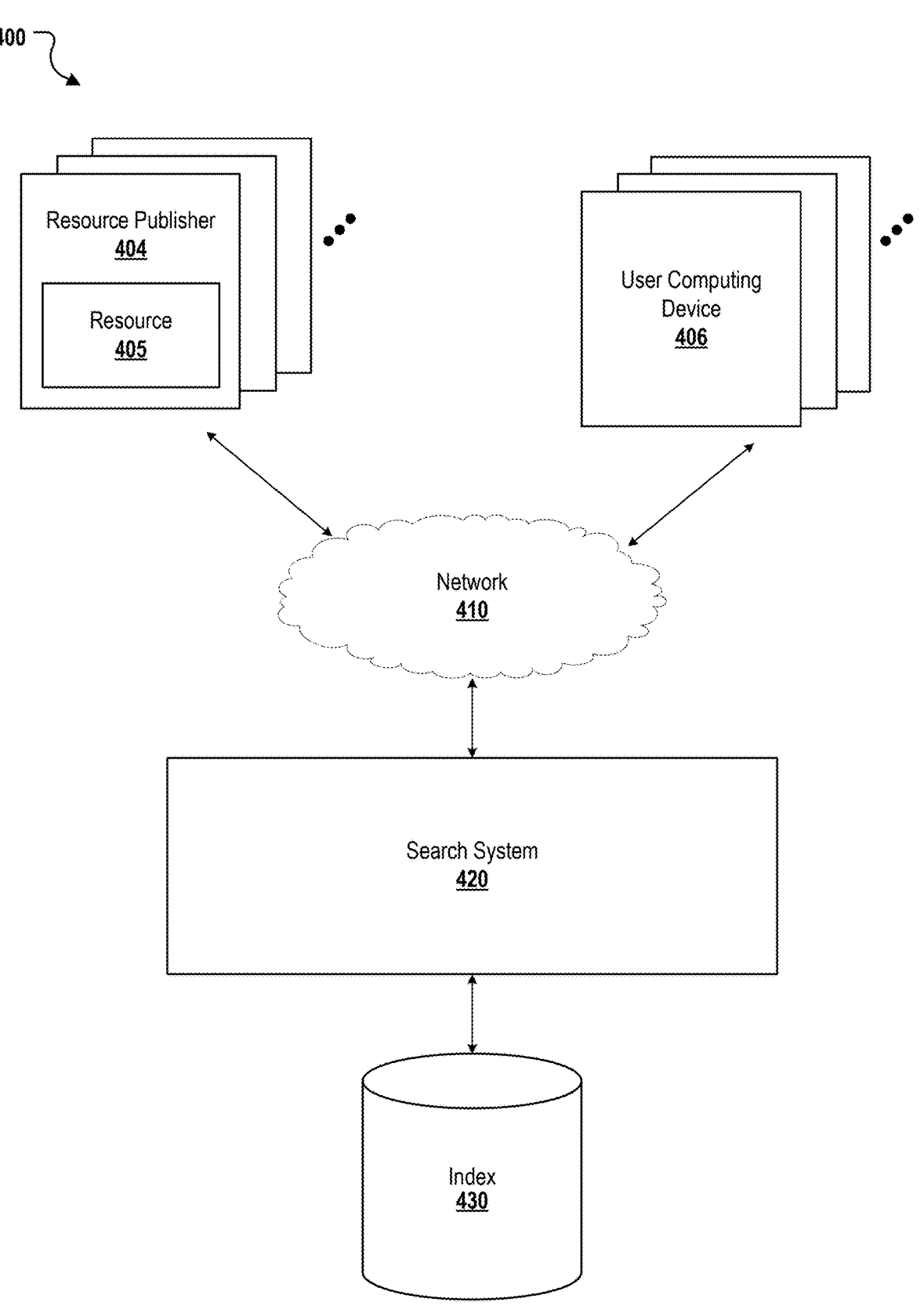
FIG. 4 depicts an example architecture that can be employed to execute implementations of the present disclosure.

FIG. 4 is a block diagram of an example architecture 400 in which the described goal automation system is integrated with a search system. As depicted, a communications network 410 connects resource publishers 404, user computing devices 406, and a search system 420. The communications network 410 may include wireless and wired portions. In some cases, the communications network 410 is implemented using one or more existing networks, for example, a cellular network, the Internet, a land mobile radio (LMR) network, a BLUETOOTH network, a wireless local area network (for example, Wi-Fi), a wireless accessory Personal Area Network (PAN), a Machine-to-machine (M2M) network, and a telephone network. The communications network 410 may also include future developed networks. In some implementations, the communications network 410 includes the Internet, an intranet, an extranet, or an intranet and/or extranet that is in communication with the Internet. In some implementations, the communications network 410 includes a telecommunication or a data network.

In some implementations, the resource publishers 404 publish resources 405. The resources 405 include, for example, online resources such as web resources, online documents, webpages, and the like. In some cases, a resource publisher 404 is associated with a domain and hosted by one or more servers in one or more locations. In some cases, these one or more servers include a server-class hardware type device and/or computer systems using clustered computers and components to function as a single pool of seamless resources when accessed through the communications network 410. For example, such implementations may be used in data center, cloud computing, storage area network (SAN), and network attached storage (NAS) applications. In some implementations, the one or more servers are deployed using a virtual machine(s).

In some cases, the resource publishers 404 publish the resources 405 via a website. Such a website may include a collection of online resources 405. An online resource may include data that can be provided over the communications network 410 via a resource address, e.g., a uniform resource locator (URL). In some cases, the online resources 405 are formatted in a markup language, e.g., hypertext markup language (HTML), extensible markup language (XML), and the like. Online resources 405 may include, for example, text, images, multimedia content, programming elements, and the like. Other example online resources include, but are not limited to, images files, video files, audio files, feed sources, and the like. In some cases, the online resources 405 include embedded information such as metadata information; hyperlinks; embedded instructions, e.g., scripts; and the like.

In some implementations, the search system 420 accesses an index 430 to search resources 405. In some implementations, the index 430 includes a datastore of resources 405 generated by crawling the information, e.g., websites, provided by the resource publisher 404. In some implementations, the index 430 is a repository for persistently storing and managing collections of data. Example data stores, such as the index 430, that may be employed within the described system include data repositories, such as a database as well as simpler store types, such as files, emails, and so forth. In some implementations, the search index 430 includes a database. In some implementations, a database is a series of bytes or an organized collection of data that is managed by a database management system (DBMS).

In some implementations, user computing device(s) 406 is an electronic device capable of requesting and receiving resources over the communications network 410. Example user computing devices 406 include personal computers, mobile communication devices, tablet computers, Extended Reality (XR) devices, and the like. The user computing devices 406 may include, e.g., may each include, any appropriate type of computing device, such as a desktop computer, a laptop computer, a handheld computer, a tablet computer, a personal digital assistant (PDA), an augmented reality (AR)/virtual reality (VR) device, a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In some implementations, the user computing devices 406 are configured to submit a prompt via an agent, to the search system 420, e.g., using a web service provided by the search system 420. In some implementations, the agent described above with reference to FIG. 1, is executed on the user computing devices 406. In some implementations, the agent is executed as a service provided by the search system 420. In some implementations, in response to each prompt, the search system 420 is configured to identify resources that are relevant to the query from the information stored in the index 430. For example, the search system 420 may, for example, identify the resources 405 in the form of search results. Once generated, the search results are provided as part of a search result page to the user device 406 from which the query was received.

A resource search result is data generated by the search system 420 that identifies a resource and provides information that satisfies a particular search query. A resource search result for a resource can include a webpage title, a snippet of text extracted from the resource, and a resource locator for the resource, e.g., the URL.

Example Process

Figure 5:
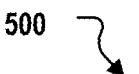
FIG. 5 depicts a flowchart of a non-limiting process that can be performed by implementations of the present disclosure.
Figure 5:
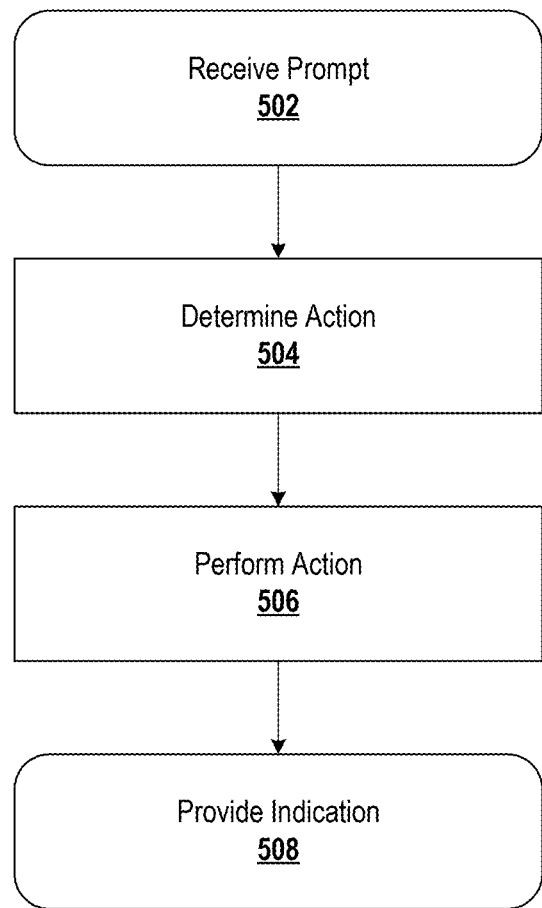

FIG. 5 depicts a flowchart of an example process 500 that can be implemented by implementations of the present disclosure. The example process 500 can be implemented by systems and components described with reference to FIG. 4. The example process 500 generally shows in more detail how an agent determines and executes a set of actions related to an instruction provided by a user.

For clarity of presentation, the description that follows generally describes the example process 500 in the context of FIGS. 1-4 and 6. However, it will be understood that the process 500 may be performed, for example, by any other suitable system, environment, software, and hardware, or a combination of systems, environments, software, and hardware as appropriate. In some implementations, various operations of the process 500 can be run in parallel, in combination, in loops, or in any order.

At 502, the generative model receives a prompt that includes an instruction for a user from the browser (or any other application within which the agent is integrated). For example, the browser may provide the prompt to the plan model 112 component of the generative model.

From 502, the process 500 proceeds to 504 where the plan model 112 determines actions related to a series of tasks to accomplish the instruction based on browser data associated with the user. In some cases, the actions are to be performed using at least one online resource. In some cases, the browser data includes a browsing history associated with the user, actions performed by the user via the browser, transaction data associated with the user, location data associated with the user, and/or personal preferences set by the user via the browser.

In some cases, the plan model 112 may determine one or more actions for an instruction (or tasks related to an instruction) based on browser data that is associated with other users. For example, when the user has little to no interaction with the browser and/or a related online resource, i.e., the browser data associated with the user lacks information that is relevant to a task or an instruction, the plan model 112 may be configured to use a global set of browser data collected, based on user permissions, that is related to a particular task and/or instruction.

From 504, the process 500 proceeds to 506 where the action model 116 component of the generative model performs the actions associated with each task via the associated online resource. In some implementations, the action model 116 performs an action via the associated online resource(s) by determining a context for the user, processing the context and action (and/or related task), and performing the action (e.g., navigating to a form, populating a form field, and the like). In some cases, the action model 116 determines the context by processing the action (and/or related task) and the browser data associated with the user. In some cases, an online resource that is associated with an action includes a form. In such cases, the actions to complete the action may include the action model 116 providing data, via the browser, to the form (e.g., autofill) and receiving a response from the form, via the browser, based on the provided data.

In some cases, the action model 116 may execute some actions (and/or a set of actions related to a particular task) in a series i.e., as a sequence of actions. For example, the action model 116 may provide the outcome of an action associated with a first task as input when performing an action associated with a second task. In some cases, the action model 116 may execute some actions in parallel. In some cases, the action model 116 may execute all actions associated with an instruction in a series or in parallel. In some cases, the action model 116 executes one or more of the actions via a background process. For example, the browser may provide an indication, e.g., via the page element 202, that the generative model is working on completing an instruction while the user continues to interact with the browser.

In some implementations, the action model 116 performs each action by determining a set of instructions to perform the action and providing the set of instructions to the browser to perform the action. For example, the action model 116 may provide the browser instructions for how to populate a form and in which order to populate to form fields.

In some implementations, the action model 116 provides a user prompt, via the browser. In some cases, the user prompt is related to an action (or a task). In some cases, the action model 116 may provide a prompt to the user via the browser when additional information is needed to complete the action, task, or the overall instruction. In some cases, the action model 116 may receive, via the browser, a response to the user prompt and update the associate action, task, or the overall instruction in the memory model 114 based on the response. In some cases, the action model 112 may provide, via the browser, a status for one or more tasks.

From 506, the process 500 proceeds to 508 where the action model 116 provides an indication, via the browser, that the instruction/goal is completed based on completing the plurality of actions. In some implementations, the indication includes a prompt or an alert message provided via an overlay window, a tab, or separate browser window within the browser.

In some implementations, the action model 116 may provide the indication via a model device. For example, a user may provide the generative model a command to provide the outcome of the instruction to a mobile device, e.g., based on users setting, information provided with the initial prompt, or based on a user prompt provided via the generative model. In some cases, the browser and mobile device may be associated in some way. For example, the browser may be installed on the mobile device or may share a configuration or otherwise be in communication with an application, such as another browser application, installed on the mobile device. In some cases, the indication provided via the mobile device may be provided via an alert, an SMS message, an email, an audio tone, or any other form of communication based on the mobile device's capabilities.

In some implementations, the components of the generative model, such as the plan model 112, the memory model 114, and the action model 116, are trained via supervised learning using a labeled data set that includes a recording of the user executing a task (e.g., a series of tasks) related to the instruction. In some cases, components of the generative model, such as the plan model 112, the memory model 114, and the action model 116, are trained using a recording of actions associated with a task that was executed by the user via the browser, such as described above with reference to FIGS. 3A-3C.

Example System

Figure 6:
FIG. 6 is a diagram that illustrates an example of a distributed computer device that can be used to implement the described techniques.

FIG. 6 shows an example of a computing device 600, which may be search system 420 of FIG. 4, which may be used with the techniques described here. The example computing device 600 can be programmed or otherwise configured to implement systems or methods of the present disclosure. Computing device 600 is intended to represent various example forms of large-scale data processing devices, such as servers, blade servers, data centers, mainframes, and other large-scale computing devices. Computing device 600 may be a distributed system having multiple processors, possibly including network attached storage nodes, that are interconnected by one or more communications networks. The components shown here, their connections and relationships, and their functions, are meant to be examples only, and are not meant to limit implementations of the implementations described and/or claimed in this document.

Computing device 600 may be a distributed system that includes any number of computing devices 680, e.g., 680a, 680b, . . . 680n. Computing devices 680 may include a server or rack servers, mainframes, and the like, communicating over a local or wide-area network, dedicated optical links, modems, bridges, routers, switches, wired or wireless networks, and the like.

In some implementations, each computing device may include multiple racks. For example, the computing device 680*a* includes multiple racks, e.g., 658*a*, 658*b*, . . . , 658*n*. Each rack may include one or more processors, such as processors 652*a*, 652*b*, . . . , 652*n* and 662*a*, 662*b*, . . . , 662*n*. The processors may include data processors, network attached storage devices, and other computer-controlled devices. In some implementations, one processor may operate as a master processor and control the scheduling and data distribution tasks. Processors may be interconnected through one or more rack switches 662*a*-662*n*, and one or more racks may be connected through switch 678. Switch 678 may handle communications between multiple connected computing devices 600.

Each rack may include memory, such as memory 654 and memory 664, and storage, such as 656 and 666. Storage 656 and 666 may provide mass storage and may include volatile or non-volatile storage, such as network-attached disks, floppy disks, hard disks, optical disks, tapes, flash memory or other similar solid state memory devices, or an array of devices, including devices in a storage area network or other configurations. Storage 656 or 666 may be shared between multiple processors, multiple racks, or multiple computing devices and may include a non-transitory computer-readable medium storing instructions executable by one or more of the processors. Memory 654 and 664 may include, e.g., volatile memory unit or units, a non-volatile memory unit or units, and/or other forms of non-transitory computer-readable media, such as a magnetic or optical disks, flash memory, cache, Random Access Memory (RAM), Read Only Memory (ROM), and combinations thereof. Memory, such as memory 654 may also be shared between processors 652*a*-652*n*. Data structures, such as an index, may be stored, for example, across storage 656 and memory 654. Computing device 600 may include other components not shown, such as controllers, buses, input/output devices, communications modules, and the like.

An entire system may be made up of multiple computing devices 600 communicating with each other. For example, device 680*a* may communicate with devices 680*b*, 680*c*, and 680*d*, and these may collectively be known as a search system, such as the search system 420 described above with reference to FIG. 4. Some of the computing devices may be located geographically close to each other, and others may be located geographically distant. The layout of computing device 600 is an example only and the system may take on other layouts or configurations.

It should also be understood that although certain drawings illustrate hardware and software located within particular devices, these depictions are for illustrative purposes only. In some implementations, the illustrated components may be combined or divided into separate software, firmware, or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

Moreover, various implementations of the systems and techniques described herein can be realized in digital electronic circuitry, integrated circuitry, specially designed ASICS (application specific integrated circuits), computer hardware, firmware, software, or combinations thereof. These various implementations can include implementation in one or more computer programs that are executable or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include computer readable or machine instructions for a programmable electronic processor and can be implemented in a high-level procedural or object-oriented programming language, or in assembly/machine language. As used herein, the terms "machine-readable medium" and "computer-readable medium" refers to any computer program product, apparatus or device, e.g., magnetic discs, optical disks, memory, Programmable Logic Devices (PLDs), used to provide machine instructions or data to a programmable processor, including a machine-readable medium that receives machine instructions as a machine-readable signal. The term "machine-readable signal" refers to any signal used to provide machine instructions or data to a programmable processor.

The functionality of the computer readable instructions may be combined or distributed as desired in various environments. In some implementations, a computer program includes one sequence of instructions. In some implementations, a computer program includes a plurality of sequences of instructions. In some implementations, a computer program is provided from one location. In other implementations, a computer program is provided from a plurality of locations. In various implementations, a computer program includes one or more software modules. In various implementations, a computer program includes, in part or in whole, one or more web applications, one or more mobile applications, one or more standalone applications, one or more web browser plug-ins, extensions, add-ins, or add-ons, or combinations thereof.

Further to the descriptions above, a user may be provided with controls allowing the user to make an election as to both if and when systems, programs, or features described herein may enable collection of user information, e.g., information about a user's social network, social actions, or activities, profession, a user's preferences, or a user's current location, and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained, such as to a city, ZIP code, or state level, so that a particular location of a user cannot be determined. Thus, the user may have control over what information is collected about the user, how that information is used, and what information is provided to the user.

Unless otherwise defined, the technical terms used herein have the same meaning as commonly understood by one of ordinary skill in the art to which the present subject matter belongs. As used in this specification and the appended claims, the singular forms "a," "an," and "the" include plural references unless the context clearly dictates otherwise. Any reference to "or" herein is intended to encompass "and/or" unless otherwise stated.

A number of implementations have been described. Nevertheless, it will be understood that various modifications may be made without departing from the spirit and scope of the disclosed implementations. While preferred implementations of the present disclosure have been shown and described herein, it will be obvious to those skilled in the art that such implementations are provided by way of example only. Numerous variations, changes, and substitutions will now occur to those skilled in the art without departing from the described system. It should be understood that various alternatives to the implementations described herein may be employed in practicing the described system.

Moreover, the separation or integration of various system modules and components in the implementations described earlier should not be understood as requiring such separation or integration in all implementations, and it should be understood that the described components and systems can generally be integrated together in a single product or packaged into multiple products. Accordingly, the earlier description of example implementations does not define or constrain this disclosure. Other changes, substitutions, and alterations are also possible without departing from the spirit and scope of this disclosure.

What is claimed is:

1. A method comprising:

receiving, via a first browser interface element, a prompt that includes an instruction;

determining, by a planning model, based on the instruction and browser data associated with a user, an execution sequence of a series of online-related actions, wherein the execution sequence designates at least a subset of the series of online-related actions to be performed in parallel to accelerate execution of the instruction;

performing, via an action model and in accordance with the execution sequence, the series of online-related actions by processing content from at least one online resource to determine and execute a corresponding sequence of low-level browser interactions; and providing, via a second browser interface element, an indication that the instruction is completed.

2. The method of claim 1, further comprising retrieving, from a memory model and by the planning model, history information that stores historical user interactions and preferences, wherein the history information is used to determine the execution sequence.

3. The method of claim 2, further comprising:

providing an indication of the history information to the user; and receiving an edit to the history information from the user, wherein the edited history information is used to determine the execution sequence.

4. The method of claim 1, further comprising, in response receiving the prompt:

parsing, by the planning model, content of a currently visited online resource to extract one or more parameters for the instruction;

providing the one or more parameters to the user for confirmation; and receiving confirmation of a parameter of the one or more parameters, wherein determining the execution sequence is further based on the parameter.

5. The method of claim 1, wherein the action model is configured to call a service that performs at least one of the series of online-related actions using a language-agnostic interface.

6. The method of claim 1, wherein the prompt is a first prompt, the method further comprising:

generating a second prompt to request additional information from the user in response to determining, via the planning model during the determination of the execution sequence, that additional information is necessary to perform at least one of the series of online-related actions;

receiving a response to the second prompt; and updating the execution sequence based on the response.

7. The method of claim 1, wherein the prompt is a first prompt and the indication includes a second prompt or an alert message provided via an overlay window, a tab, or separate browser window.

8. The method of claim 1, wherein at least one of the series of online-related actions involves providing protected information to a form on the at least one online resource, and wherein performing the at least one of the series of online-related actions includes the action model invoking an autofill feature of a browser to provide the protected information in a manner that isolates the planning model and the action model from raw authentication data.

9. The method of claim 1, wherein the series of online-related actions is associated with at least one task associated with the instruction and the indication includes information related to completing the at least one task.

10. The method of claim 1, wherein at least one of the planning model or the action model is trained based on a recording of actions associated with a task executed by the user via a browser.

11. The method of claim 1, wherein the series of online-related actions includes a first action, the instruction is a first instruction, and at least one of the planning model or the action model is trained, via supervised learning, using a labeled data set that includes a recording of the user executing a second action related to a second instruction.

12. The method of claim 1, wherein the sequence of low-level browser interactions comprises at least one of a click, a type, or a scroll.

13. The method of claim 1, wherein performing the series of online-related actions is executed as a background process, allowing a user to continue to interact with a browser.

14. The method of claim 1, wherein the content comprises at least one of text, an image, or a user interface structure of the at least one online resource.

15. The method of claim 1, wherein the planning model designates the subset of the series of online-related actions to be performed in parallel based on determining an absence of a dependency between the actions in the subset.

16. A non-transitory computer-readable medium storing executable instructions that when executed by an electronic processor, cause the electronic processor to:

receive, via a first browser interface element, a prompt that includes an instruction;

determine, by a planning model, based on the instruction and browser data associated with a user, execution sequence of a series of online-related actions, wherein the execution sequence designates at least a subset of the series of online-related actions to be performed in parallel to accelerate execution of the instruction;

perform, via an action model and in accordance with the execution sequence, the series of online-related actions by processing content from at least one online resource to determine and execute a corresponding sequence of low-level browser interactions; and provide, via a second browser interface element, an indication that the instruction is completed.

17. The non-transitory computer-readable medium of claim 16, wherein the execution sequence further designates a first action and a second action of the series of online-related actions to be performed in a series based on a determined dependency between the first action and the second action.

18. A system comprising:

a browser having a first interface element and a second interface element;

a planning model;

an action model; and an electronic processor configured to:

receive, via the first interface element, a prompt that includes an instruction;

determine, by the planning model, based on the instruction and browser data associated with a user, an execution sequence of a series of online-related actions, wherein the execution sequence designates at least a subset of the series of online-related actions to be performed in parallel to accelerate execution of the instruction;

perform, via the action model and in accordance with the execution sequence, the series of online-related actions by processing content from at least one online resource to determine and execute a corresponding sequence of low-level browser interactions; and provide, via the second interface element, an indication that the instruction is completed.

19. The system of claim 18, wherein the planning model is further configured to retrieve history information that stores historical user interactions and preferences and use the history information to determine the execution sequence.

20. The system of claim 18, wherein the at least one online resource includes a form, and wherein the series of online-related actions includes providing data to the form using an autofill feature of the browser and receiving a response from the form.

* * * * *